United States Patent [19]

Spencer et al.

[11] Patent Number: 4,992,904
[45] Date of Patent: Feb. 12, 1991

[54] HYBRID CONTACTOR FOR DC AIRFRAME POWER SUPPLY

[75] Inventors: William M. Spencer; Joseph S. Breit, both of Rockford, Ill.

[73] Assignee: Sundstrand Corporation, Rockford, Ill.

[21] Appl. No.: 436,021

[22] Filed: Nov. 14, 1989

[51] Int. Cl.⁵ .......................................... H02H 3/087
[52] U.S. Cl. ............................................ 361/5; 361/8; 361/13
[58] Field of Search ................. 361/5, 6, 8, 9, 10, 361/13, 87, 92, 98; 317/140

[56] References Cited

U.S. PATENT DOCUMENTS

| | | | |
|---|---|---|---|
| 4,420,784 | 12/1983 | Chen et al. | 361/13 X |
| 4,438,472 | 3/1984 | Woodworth | 361/13 |
| 4,636,906 | 1/1987 | Anderson et al. | 361/13 |
| 4,636,907 | 1/1987 | Howell | 361/13 |
| 4,760,483 | 7/1988 | Kugelman et al. | 361/13 |
| 4,772,809 | 9/1988 | Koga et al. | 307/140 |
| 4,812,943 | 3/1989 | Jones et al. | 361/93 |

Primary Examiner—Derek S. Jennings
Attorney, Agent, or Firm—Antonelli, Terry, Stout & Kraus

[57] ABSTRACT

A contactor (12) for controlling connection of a DC power supply to an electrical load (14) in includes a series circuit (19) disposed between a nonground DC potential and a load having first (20) and second (22) relays each having a pair of contacts (26), the first relay and the second relay having a conducting state when the pair of contacts are closed and a non-conducting state when the pair of contacts are open which control current flow between the DC power supply and the load with the states being controlled by control signals applied to the relays; a semiconductor switch (24) having a conductive state controlled by a control signal to turn on the semiconductor switch to connect the semiconductor switch in parallel with the contacts of the first relay and a non-conductive state controlled by a control signal to turn off the semiconductor switch to disconnect the terminals of the semiconductor switch; a fault sensor (50) coupled to the load for generating a signal in response to the load drawing current exceeding a threshold to cause the second relay to open to disconnect the load from the power supply; and a control signal generator (28) for generating the control signals of the switches.

35 Claims, 1 Drawing Sheet

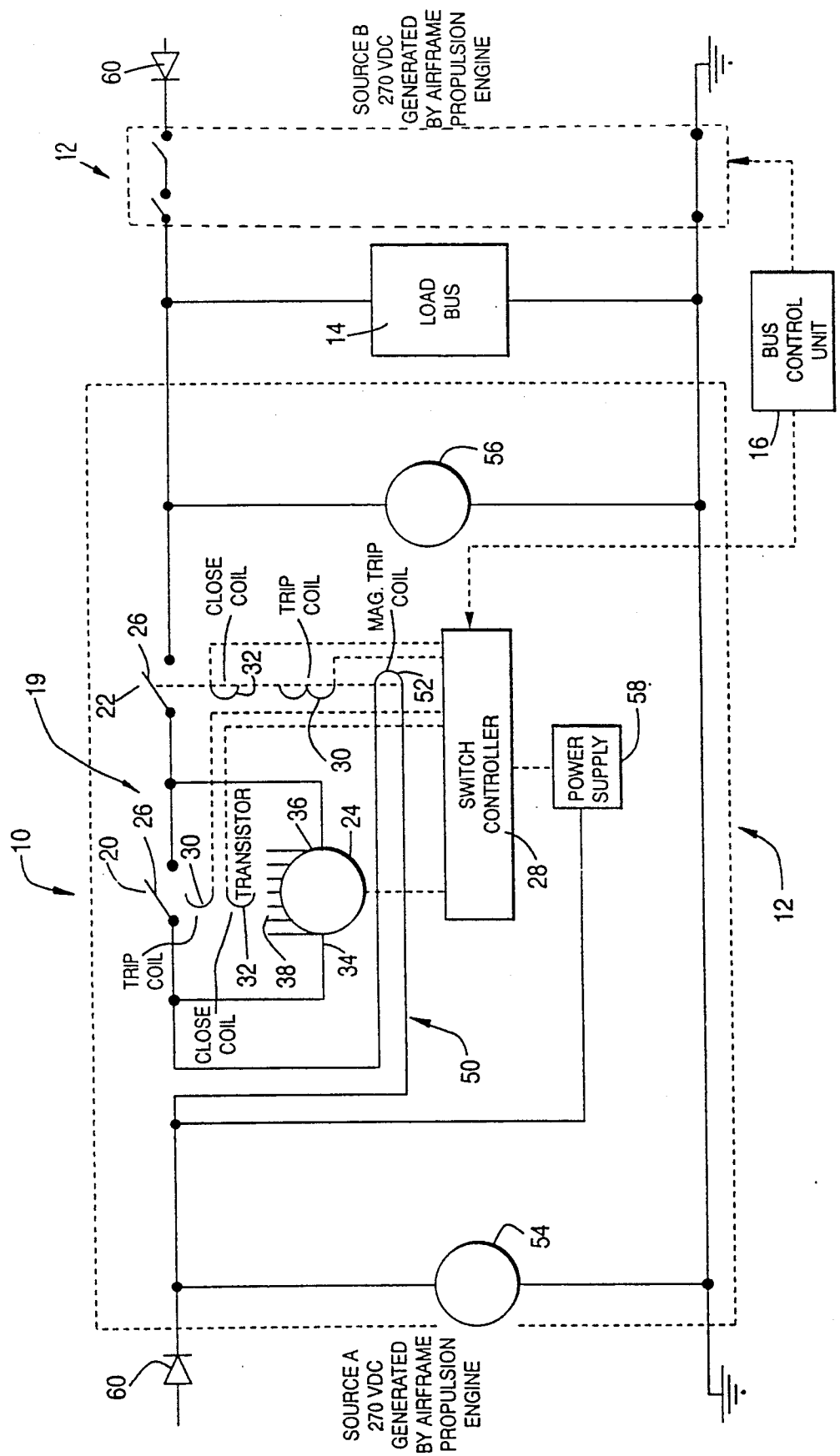

HYBRID CONTACTOR FOR DC AIRFRAME POWER SUPPLY

TECHNICAL FIELD

The present invention relates to contactors for DC power supplies in airframes.

BACKGROUND ART 270 volt DC power supplies have been proposed for airframes. A three phase alternator is driven by each propulsion engine of the airframe to generate variable frequency three phase AC. The three phase AC is rectified to produce 270 volt DC which becomes the main potential for powering appliances in the airframe with inverters being used to generate AC where necessary. The proposed DC power supplies utilize contactors to connect and disconnect the 270 volt DC produced by each propulsion engine to an electrical load. Contactors of the aforementioned type will be required to switch 270 volts at high current levels typically of 100 amperes or more. Furthermore, the DC output power produced by each propulsion engine may be selectively coupled in series with an electrical load or coupled in parallel with the DC output potential produced by another propulsion engine for driving the load in parallel. A bus control unit will control the connection of a main power bus selectively to the electrical load(s) and to the DC potential generated by generators driven by each of the propulsion engines.

U.S. Pat. No. 4,772,809 discloses a switching circuit relay for preventing arcing when connecting and disconnecting an AC power source from an electrical load. FIG. 4 discloses an embodiment in which a relay Xl is in series with a parallel combination of a relay Y2 and a triac T. Because the potential is AC no consideration is given to disconnecting the load from the AC source with respect to a non-ground potential. Fault protection for interrupting connection of the load to the AC power source is not provided.

Arc suppression circuits are known which utilize a combination of relays and semiconductor switches. See U.S. Pat. Nos. 4,438,472, 4,636,906, 4,636,907 and 4,760,483.

DISCLOSURE OF INVENTION

The present invention provides a contactor for controlling connection of a DC power supply to an electrical load which may be a load bus in an airframe. With the invention, a combination of relays and at least one semiconductor switch is used to suppress arcs consequent from switching high currents of 100 amperes or more at potentials of 270 volts which is a standard which has been proposed for airframe power supplies which utilize DC. The contactor of the present invention minimizes switching losses, provides total dielectric isolation of the DC power supply from the load, has protection against voltage transients and has a fault protection mode only requiring current flow between the power supply and the load.

A contactor in accordance with the present invention for controlling connection of a DC power supply to an electrical load includes a series circuit disposed between a non-ground DC power supply potential and a load having first and second relays each having a pair of contacts, the first relay and the second relay having a conducting state when the pair of contacts are closed and a non-conducting state when the pair of contacts are open which control current flow between the DC power supply and the load with the states being controlled by control signals applied to the relays; a semiconductor switch having a conductive state controlled by an applied control signal which turns on the semiconductor switch to connect terminals of the semiconductor switch together and in parallel with the contacts of the first relay and a non-conductive state controlled by an applied control signal which turns off the semiconductor switch to disconnect the terminals of the semiconductor switch; a fault sensor coupled to the load for generating a signal in response to the load which causes the second relay to open to disconnect the load from the DC power supply; and a control signal generator for generating the control signals for connecting the DC power supply to the load by sequentially in time closing the contacts of the second relay, causing the semiconductor switch to turn on to connect the semiconductor switch terminals together, causing the contacts of the first relay to close, and turning off the semiconductor switch and for disconnecting the DC power supply from the load by sequentially in time causing the semiconductor switch to turn on to connect the semiconductor switch terminals causing the terminals of the first relay to be disconnected, causing the semiconductor switch to turn off and causing the terminals of the second relay to be disconnected. The semiconductor switch has a higher impedance measured between the terminals of the semiconductor switch than an impedance measured between closed contacts of the first relay; The contactor is disposed on an airframe, the load is connected to a load bus, and the DC power supply provides 270 volts. The fault sensor is disposed between the DC power supply and the first relay and is powered by load current.

A contactor for controlling connection of a DC power supply to an electrical load in accordance with the invention includes a series circuit disposed between a non-ground power supply potential and a load having first and second relays each having a pair of contacts, the first relay and the second relay having a conducting state when the pair of contacts are closed and a non-conducting state when the pair of contacts are open which control current flow between the DC power supply and the load with the states being controlled by control signals applied to the relays; a semiconductor switch having a conductive state controlled by an applied control signal which turns on the semiconductor switch to connect terminals of the semiconductor switch together and in parallel with the contacts of the first relay and a non-conductive state controlled by an applied control signal which turns off the semiconductor switch to disconnect the terminals of the semiconductor switch; and a control signal generator for generating the control signals for connecting the DC power supply to the load by sequentially in time closing the contacts of the second relay, causing the semiconductor switch to turn on to connect the semiconductor switch terminals together, causing the contacts of the first relay to close and turning off the semiconductor switch and for disconnecting the DC power supply from the load by sequentially in time causing semiconductor switch to turn on to connect the semiconductor switch terminals, causing the terminals of the first relay to be disconnected, causing the semiconductor switch to turn off and causing the terminals of the second relay to be disconnected. The semiconductor switch has a higher impedance measured between the terminals of the semiconductor device than an impedance measured between the closed contacts of the first relay; The contactor is disposed in an airframe, the load is connected to a load bus and the DC power supply provides 270 volts.

A contactor for controlling connection of a DC power supply to an electrical load in accordance with the invention includes a series circuit disposed between a non-ground power supply potential and a load having first and second relays each having a pair of contacts, the first relay and the second relay having a conducting state when the pair of contacts are closed and a non-conducting state when the pair of contacts are open which control current flow between the DC power supply and the load with the states being controlled by control signals applied to the relays; a semiconductor switch having a conductive state controlled by an applied control signal which turns on the semiconductor switch to connect terminals of the semiconductor switch together and in parallel with the contacts of the first relay and a non-conductive state controlled by an applied control signal which turns off the semiconductor switch to disconnect the terminals of the semiconductor switch from the contacts of the first relay; a fault sensor coupled to the load for generating a signal in response to the load drawing current exceeding a threshold which causes the second relay to open to disconnect the load from the power supply; and a control signal generator for generating the control signals to control connecting the DC power supply to the load and disconnecting the DC power supply from the load. The semiconductor switch has a higher impedance measured between the terminals of the semiconductor switch than an impedance measured between the closed contacts of the first relay The contactor is disposed on an airframe, the load is connected to a load bus and the DC power supply provides 270 volts. The fault sensor is disposed between the DC power supply and the first relay and is powered by load current.

A DC power supply for an airframe in accordance with the invention includes a plurality of contactors each for controlling connection and disconnection of a DC potential to and from an electrical load, each contactor including a series circuit disposed between a DC power supply potential and a load having first and second relays each having a pair of contacts, the first relay and the second relay having a conducting state when the pair of contacts are closed and a non-conducting state when the pair of contacts are open which control current flow between the DC power supply and the load with the states being controlled by control signals applied to the relays, a semiconductor switch having a conductive state controlled by an applied control signal which turns on the semiconductor switch to connect terminals of the semiconductor switch together and in parallel with the contacts of the first relay and a non-conductive state controlled by an applied control signal which turns off the semiconductor switch to disconnect the terminals of the semiconductor switch from the contacts of the first relay, a fault sensor coupled to the load for generating a signal in response to the load drawing a current exceeding a threshold which causes the second relay to open to disconnect the load from the DC potential; and a control signal generator for generating the control signals for connecting the DC power supply to the load by sequentially in time closing the contacts of the second relay, causing the semiconductor switch to turn on to connect the semiconductor terminals together, causing the contacts of the first relay to close and turning off the semiconductor switch and for disconnecting the DC power supply from the load by sequentially in time causing the semiconductor switch to turn on to connect the semiconductor switch terminals, causing the terminals of the first relay to be disconnected, causing the semiconductor switch to turn off and causing the terminals of the second relay to be disconnected and; and a bus control unit for controlling the connection and disconnection of the contactors to and from a load bus to which each load is connected. Each semiconductor switch has a higher impedance measured between terminals of the semiconductor switch than an impedance measured between the closed contacts of the first relay. The DC power supply provides 270 volts. The fault sensor is disposed between the non-ground DC potential and the first relay and is powered by load current.

A DC power supply for an airframe in accord with the invention includes a plurality of contactors for controlling connection and disconnection of a DC potential to and from an electrical load, each contactor including a series circuit disposed between a DC power supply potential and a load having first and second relays each having a pair of contacts, the first relay and the second relay having a conducting state when the pair of contacts are closed and a non-conducting state when the contacts are open which control current flow between the DC power supply and the load with the states being controlled by control signals applied to the relays, a semiconductor switch having a conductive state controlled by an applied control signal which turns on the semiconductor switch to connect terminals of the semiconductor switch together and in parallel with the contacts of the first relay and a non-conductive state controlled by an applied control signal to disconnect the terminals of the semiconductor switch, and a control signal generator for generating the control signals for connecting the DC power supply to the load by sequentially in time closing the contacts of the second relay, causing the semiconductor switch to turn on to connect the semiconductor terminals together, causing the contacts of the first relay to close and turning off the semiconductor switch and for disconnecting the DC power supply from the load by sequentially in time causing the semiconductor switch to turn on to connect the semiconductor switch terminals, causing the terminals of the first relay to be disconnected, causing the semiconductor switch to turn off and causing the terminals of the second relay to be disconnected; and a bus control unit for controlling the connection and disconnection of the conductors to and from a load bus to which each load is connected. Each semiconductor switch has a higher impedance measured between terminals of the semiconductor switch than an impedance measured between closed contacts of the first relay.

A DC power supply for an airframe in accordance with the invention includes a plurality of contactors for controlling connection of a DC potential to and from an electrical load, each contactor including a series circuit disposed between a non-ground power supply potential and a load having first and second relays each having a pair of contacts, the first relay and the second relay having a conducting state when the pair of contacts are closed and a non-conducting state when the pair of contacts are open which control current flow between the DC power supply and the load with the states being controlled by control signals applied to the relays, a semiconductor switch having a conductive state controlled by an applied control signal which turns on the semiconductor switch to connect terminals of the semiconductor switch together and in parallel with the contacts of the first relay and a non-conductive state controlled by an applied control signal which turns off the semiconductor switch to disconnect the terminals of the semiconductor switch, a fault sensor coupled to the load for generating a signal in response to the load drawing a current exceeding a threshold which causes the second relay to open to disconnect the load from the DC potential, and a control signal generator for generating the control signals to control connecting the DC power supply to the load and disconnecting the DC power supply from the load; and a bus control unit for controlling connection and disconnection of the contactors to and from the load bus to which each load is connected. Each semiconductor switch has a higher impedance measured between terminals of the semiconductor switch than an impedance measured between closed contacts of the first relay. The DC power supply provides 270 volts. Each contactor has a fault sensor disposed between the non-ground DC potential and the first relay and is powered by load current.

BRIEF DESCRIPTION OF DRAWING

The figure illustrates a DC power supply in accordance with the present invention for use in an airframe and a contactor in accordance with the present invention.

BEST MODE FOR CARRYING OUT THE INVENTION

The figure illustrates a DC power generating system 10 in accordance with the present invention. The DC power generating system 10 is comprised of a plurality of contactors 12. A preferred implementation of a contactor 12 in accordance with the present invention is contained within the dotted rectangular box. Each contactor 12 is connected to a source of 270 volt DC. Each source of 270 volt DC is produced by a DC power generating system (not illustrated) driven by an airframe propulsion engine. The airframe propulsion engine(s) and airframe are indicated symbolically by the electrical ground reference. Dotted lines connecting electrically controlled elements in the figure symbolize logic level potentials. Solid lines connecting electrical elements symbolize bus potential. Each DC power generating system is comprised of a three phase alternator connected to a power takeoff from the airframe propulsion engine which produces variable frequency three phase AC power. The three phase AC power is rectified by rectifiers to produce the 270 volt DC. The function of each contactor 12 is to selectively control the connection and disconnection of the 270 volt DC source to the load bus 14 which contains one or more electrical loads and to protect the load bus from damage by drawing more than a rated current such as that caused by a short circuit in the load(s). The electrical generating system 10 may be operated so that each of the plurality of DC power generators are connected in parallel to the load bus 14. Alternatively, only a single DC power generator through a single contactor 12 may be used to drive the load bus 14. Operation of the power generating system 10 to selectively drive the load bus 14 in parallel with multiple DC power generators or with a single DC power generator is under the control of a bus control unit 16. The bus control unit 16 operates in a manner analogous to bus control units utilized in AC electrical power generating systems manufactured by the assignee of the present invention in which multiple AC power generators are selectively coupled in parallel to a load bus or in isolation with a single load with individual loads being isolatable from other loads the load bus. As illustrated, the load bus 14 and bus control unit 16 are only symbolic of implementations for interconnecting the DC power generators to the load bus.

A contactor 12 in accordance with the present invention performs three functions which are the connection of a DC voltage source to the load bus 14, the disconnection of the DC voltage source from the load bus and the disconnection of the DC voltage source from the load bus upon the detection of a load fault for purposes of protecting the system The non-ground potential of the DC power supply is connected to the load bus 14 by a series circuit 19 which contains a first relay 20 and a second relay 22. The aforementioned functions are performed by controlling the conductivity of the first relay 20, the second relay 22 and a semiconductor switch 24. The first and second relays 20 and 22 have a pair of contacts as symbolically indicated by member 26. Each relay 20 and 22 is respectively opened and closed by a signal applied from switch controller 28 to a trip coil 30 and a close coil 32 which are conventional. The conductivity of the relays 20 and 22 is latched and only changes in response to the application of a control signal to the appropriate coil to change the latched state. However, the present invention may be practiced with relays of differing designs which may be controlled to open and close in response to logic voltages applied to one or more windings. The first relay 20 has a smaller switching power rating than the second relay 22. The second relay has a higher switching power rating for the reason that it may break the entire current flowing from the DC voltage source to the load bus 14 if a failure occurs in either relay 20 or switch 24. The first relay 20 does not break current flow between the DC voltage source and the load bus 14. The semiconductor switch 24 breaks the current flow between the DC source and the load bus. The semiconductor switch 24 may be any solid state semiconductor switch such as, but not limited to a power bipolar transistor, which turns on in response to a control signal to connect terminals 34 and 36 together and turns off to disconnect the terminals 34 and 36. As a consequence of the desired application of the present invention in airframes in which potentials of 270 volts with current levels above 100 amps are switched, a heat radiating structure 38 is provided on the semiconductor switch 24 which may be of any conventional design to dissipate the substantial energy produced by switching.

The switch controller 28 may be of any conventional design to produce logic voltage levels required to switch the conductivity of the first relay 20, the second relay 22 and the semiconductor switch 24 as follows. During normal operation when the contactor 12 is carrying a current, the first relay 20 and the second relay 22 are closed and the semiconductor switch 24 is turned off. To disconnect the load bus 14 from the DC voltage source, sequentially in time the semiconductor switch 24 is turned on to split current flow between the first relay 20 and the semiconductor switch 24 with the majority of the load current going through the first relay, the first relay is opened causing the load current to be carried totally by the semiconductor switch 24, the semiconductor switch is turned off disconnecting the load, and finally the second relay 22 is opened. As a result of the semiconductor switch 24 breaking the main current flow, arcing damage to the contacts of the relays is prevented. If the first relay 20 or the semiconductor switch 24 has failed, the second relay 22 will break the main current flow which is the reason why it has a higher interrupt current rating. When the load bus 14 is to be connected to the DC voltage source, the switching operation produced by the switch controller 28 is opposite to the switch operation when connecting the voltage source to the load bus 14. When connecting the load bus 14 to the DC voltage source, sequentially in time the second relay 22 is closed with the first relay 20 being open and the semiconductor switch 24 being turned off, the semiconductor switch is turned on the first relay 20 is closed causing current flow to be split between relay 20 and the semiconductor switch with a majority of current flow being through relay 20, and the semiconductor switch is turned off to cause all of the load current to be carried by the series circuit 19 including first relay and the second relay.

As a consequence of the present invention having application in DC power supplies for airframes, it is necessary to provide fault protection for the load bus 14. A fault detector 50 functions to cause the second relay 22 to open in response to a short circuit or the load bus 14 drawing current above a current threshold which is the maximum rated current of the load(s). The fault detector 50 is electrically powered by he current flow from the DC voltage source to the load bus with no other electrical excitation being necessary. The fault detector 50 is in the form of a winding 52 in series with the current flow from the DC voltage source to the load bus 14 which when the current flow exceeds the threshold produces a sufficient magnetic field to trip the second relay 22. In this situation, the load bus 14 will be disconnected to prevent its potential damage. The bus control unit 16 functions in a conventional fashion to attempt to reconnect the load bus 14 to the DC power supply which was disconnected from the load bus by opening of the second switch 22 in response to the current flow between the DC source and the load bus above the threshold or, alternatively, by attempting to connect another contactor 12 such as the contactor 12 symbolically indicated to the right of the load bus 14 in the figure to the load bus. The second relay 22 provides failsafe operation for disconnecting the DC voltage source from the load bus 14. In a circumstance where either the first relay 20 or the semiconductor switch 24 fail, in which case it is likely failure will occur in the closed state or conductive state, the main current flow is broken by opening of the second relay 22 under the control of the switch controller 28. If an overcurrent condition exists, as detected by the fault detector 50 which causes failure of either the first relay 20 or the semiconductor switch 24, the resultant high current flow between the voltage source and the load bus 14 through the fault detector winding 52 will result in tripping of the second relay 22.

The relative impedances of the first relay 20, the second relay 22 and the semiconductor switch 24 in their conductor states are chosen as follows. The semiconductor switch 24 has a higher impedance measured between the terminals 34 and 36 than an impedance measured between closed contacts of the first relay 20 or second relay 22. The aforementioned impedances provide for high efficiency operation which dissipates the minimum level of energy during the closure of the contactor 12 to provide current flow from the DC voltage source to the load bus 14.

As a result of the first relay 20 and the second relay 22 being contained in series circuit 19 which is disposed between a non-ground DC potential of the DC power supply, opening of the switches 20 and 22 provides total dielectric isolation from the load bus 14 which is important in airframe applications. A transient suppressor 54, which may be a Zener diode, provides protection of the contactor 12 against voltage transients. Transient suppressor 56, which may also be a Zener diode, performs a similar function. Power supply 58 provides power for the switch controller 28. Diodes 60 provide isolation between the plural DC voltage sources.

The semiconductor switch 24 switches more of the current in connecting and disconnecting the voltage source from the load bus 14 than the first relay 20 to protect the contacts of the first relay against failure. Since the semiconductor switch 24 is a solid state device, it does not have contact wear or damage caused by arcs which improves the overall life of the contactor 12 during which no service is required. The cooler 38 prolongs the life of the semiconductor switch 24. The second relay 22 provides backup protection and dielectric isolation between the load bus 14 and the DC voltage source.

While the invention has been described in terms of its preferred embodiment, it should be understood that numerous modifications may be made thereto without departing from the spirit and scope of the present invention. For example, while the figure illustrates a pair of contactors 12 which are connected to the load bus 14 in actual practice, any number of contactors 12 may be connected to one or more load buses 14 which are connected in different configurations to provide high voltage DC excitation to loads on an airframe.

We claim:

1. A contactor for controlling connection of a DC power supply to an electrical load comprising:
   a series circuit disposed between a non-ground DC power supply potential and a load having first and second relays each having a pair of contacts, the first relay and the second relay having a conducting state when the pair of contacts are closed and a non-conducting state when the pair of contacts are open which control current flow between the DC power supply and the load with the states being controlled by control signals applied to the relays;
   a semiconductor switch having a conductive state controlled by an applied control signal which turns on the semiconductor switch to connect terminals of the semiconductor switch together and in parallel with the contacts of the first relay and a non-conductive state controlled by an applied control signal which turns off the semiconductor switch to disconnect the terminals of the semiconductor switch;
   a fault sensor coupled to the load for generating a signal in response to the load drawing current exceeding a threshold which causes the second relay to open to disconnect the load from the DC power supply; and
   a control signal generator for generating the control signals for connecting the DC power supply to the load by sequentially in time closing the contacts of the second relay, causing the semiconductor switch to turn on to connect the semiconductor switch terminals together, causing the contacts of the first relay to close and turning off the semiconductor switch and for disconnecting the DC power supply from the load by sequentially in time causing the semiconductor switch to turn on to connect the semiconductor switch terminals, causing the terminals of the first relay to be disconnected, causing the semiconductor switch to turn off and causing the terminals of the second relay to be disconnected.

2. A contactor in accordance with claim 1 wherein:
the semiconductor switch has a higher impedance measured between the terminals of the semiconductor switch tan an impedance measured between closed contacts of the first relay;
the second relay has a higher interrupt current rating than the first relay or the semiconductor switch;
only the second relay is opened in response to a signal from the fault sensor; and
opening of the relays provides dielectric isolation of the non-ground DC power supply potential from the load.

3. A contactor in accordance with claim 1 wherein:
the contactor is disposed on an airframe, the load is connected to a load bus and the DC power supply provides 270 volts.

4. A contactor in accordance with claim 2 wherein:
the contactor is disposed on an airframe, the load is connected to a load bus and the DC power supply provides 270 volts.

5. A contactor in accordance with claim 1 wherein:
the fault sensor is powered by load current.

6. A contactor in accordance with claim 2 wherein:
the fault sensor is powered by load current and is comprised of a winding through which load current flows to generate the signal causing the second relay to open when the load current exceeds the threshold.

7. A contactor in accordance with claim 3 wherein:
the fault sensor is powered by load current and is comprised of a winding through which load current flows to generate the signal causing the second relay to open when the load current exceeds the threshold.

8. A contactor in accordance with claim 4 wherein:
the fault sensor is powered by load current and is comprised of a winding through which load current flows to generate the signal causing the second relay to open when the load current exceeds the threshold.

9. A contact for controlling connection of a DC power supply to an electrical load comprising:
a series circuit disposed between a non-ground DC power supply potential and a load having first and second relays each having a pair of contacts, the first relay and the second relay having a conducting state when the pair of contacts are closed and a non-conducting state when the pair of contacts are open which control current flow between the DC power supply and the load with the states being controlled by control signals applied to the relays;
a semiconductor switch having a conductive state controlled by an applied control signal which turns on the semiconductor switch to connect terminals of the semiconductor switch together and in parallel with the contacts of the first relay and a non-conductive state controlled by an applied control signal which turns off the semiconductor switch to disconnect the terminals of the semiconductor switch; and
a control signal generator for generating the control signals for connecting the DC power supply to the load by sequentially in time closing the contacts of the second relay, causing the semiconductor switch to turn on to connect the semiconductor switch terminals together, causing the contacts of the first relay to close and turning off the semiconductor switch and for disconnecting the DC power supply from the load by sequentially in time causing the semiconductor switch to turn on to connect the semiconductor switch terminals, causing the terminals of the first relay to be disconnected, causing the semiconductor switch to turn off and causing the terminals of the second relay to be disconnected.

10. A contactor in accordance with claim 9 wherein:
the semiconductor switch has a higher impedance measured between the terminals of the semiconductor switch than an impedance measured between closed contacts of the first relay;
the second relay has a higher interrupt current rating than the first relay or the semiconductor switch; and
opening of the relays provides dielectric isolation of the non-ground DC power supply potential from the load.

11. A contactor in accordance with claim 9 wherein:
the contactor is disposed on an airframe, the load is connected to a load bus and the DC power supply provides 270 volts.

12. A contactor in accordance with claim 10 wherein:
the contactor is disposed on an airframe, the load is connected to a load bus and the DC power supply provides 270 volts.

13. A contactor for controlling connection of a DC power supply to an electrical load comprising:
a series circuit disposed between a non-ground power supply potential and a load having first and second relays each having a pair of contacts, the first relay and the second relay having a conducting state when the pair of contacts are closed and a nonconducting state when the pair of contacts are open which control current flow between the DC power supply and the load with the states being controlled by control signals applied to the relays;
a semiconductor switch having a conductive state controlled by an applied control signal which turns on the semiconductor switch to connect terminals of the semiconductor switch together and in parallel with the contacts of the first relay and a nonconductive state controlled by an applied control signal which turns off the semiconductor switch to disconnect the terminals of the semiconductor switch;
a fault sensor coupled to the load for generating a signal in response to the load drawing current exceeding a threshold which causes the second relay to open to disconnect the load from the DC power supply; and
a control signal generator for generating the control signals to control connecting the DC power supply to the load and disconnecting the DC power supply from the load.

14. A contactor in accordance with claim 13 wherein:
the semiconductor switch has a higher impedance measured between the terminals of the semiconductor switch than an impedance measured between closed contacts of the first relay;

the second relay has a higher interrupt current rating than the first relay or the semiconductor switch;

only the second relay is opened in response to a signal from the fault sensor; and opening of the relays provides dielectric isolation of the non-ground DC power supply potential from the load.

15. A contactor in accordance with claim 13 wherein:
the contactor is disposed on an airframe, the load is connected to a load bus and the DC power supply provides 270 volts.

16. A contactor in accordance with claim 14 wherein:
the contactor is disposed on an airframe, the load is connected to a load bus and the DC power supply provides 270 volts.

17. A contactor in accordance with claim 13 wherein:
the fault sensor is powered by load current.

18. A contactor in accordance with claim 14 wherein:
the fault sensor is powered by load current and is comprised of a winding through which load current flows to generate the signal causing the second relay to open when the load current exceeds the threshold.

19. A contactor in accordance with claim 15 wherein:
the fault sensor is powered by load current and is comprised of a winding through which load current flows to generate the signal causing the second relay to open when the load current exceeds the threshold.

20. A contactor in accordance with claim 16 wherein:
the fault sensor is powered by load current and is comprised of a winding through which load current flows to generate the signal causing the second relay to open when the load current exceeds the threshold.

21. A DC power supply for an airframe comprising:
a plurality of contactors each for controlling connection and disconnection of a DC potential to and from an electrical load, each contactor including (i) a series circuit disposed between a DC power supply potential and a load having first and second relays each having a pair of contacts, the first relay and the second relay having a conducting state when the pair of contacts are closed and a non-conducting state when the pair of contacts are open which control current flow between the DC power supply and the load with the states being controlled by control signals applied to the relays;

(ii) a semiconductor switch having a conductive state controlled by an applied control signal which turns on the semiconductor switch to connect terminals of the semiconductor switch together and in parallel with the contacts of the first relay and a non-conductive state controlled by an applied control signal which turns off the semiconductor switch to disconnect the terminals of the semiconductor switch; and (iii) a fault sensor coupled to the load for generating a signal in response to the load drawing a current exceeding a threshold which causes the second relay to open to disconnect the load from the DC potential; and (iv) a control signal generator for generating the control signals for connecting the DC power supply to the load by sequentially in time closing the contacts of the second relay, causing the semiconductor switch to turn on to connect the semiconductor switch terminals together, causing the contacts of the first relay to close and turning off the semiconductor switch and for disconnecting the DC power supply from the load by sequentially in time causing the semiconductor switch to turn on to connect the semiconductor switch terminals, causing the terminals of the first relay to be disconnected, causing the semiconductor switch to turn off and causing the terminals of the second relay to be disconnected; and a bus control unit for controlling connection and disconnection of the contactors to and from a load bus to which at least one electrical load is connected.

22. A DC power supply in accordance with claim 21 wherein in each contactor:
the semiconductor switch has a higher impedance measured between the terminals of the semiconductor switch than an impedance measured between closed contacts of the first relay;
the second relay has a higher interrupt current rating than the first relay or the semiconductor switch; and
only the second relay is opened in response to a signal from the fault sensor; and
opening of the relays provides dielectric isolation of the non-ground DC power supply potential from the load.

23. A DC power supply in accordance with claim 21 wherein:
the DC power supply provides 270 volts.

24. A DC power supply in accordance with claim 21 wherein in each contactor:
the fault sensor is powered by load current.

25. A DC power supply in accordance with claim 22 wherein in each contactor:
the fault sensor is powered by load current and is comprised of a winding through which load current flows to generate the signal causing the second relay to open when the load current exceeds the threshold.

26. A DC power supply for an airframe comprising:
a plurality of contacts each for controlling connection and disconnection of a DC potential to and from an electrical load, each contactor including (i) a series circuit disposed between a non-ground DC power supply potential and a load having first and second relays each having a pair of contacts, the first relay and the second relay having a conducting state when the pair of contacts are closed and a non-conducting state when the pair of contacts are open which control current flow between the DC power supply and the load with the states being controlled by control signals applied to the relays;

(ii) a semiconductor switch having a conductive state controlled by an applied control signal which turns on the semiconductor switch to connect terminals of the semiconductor switch together and in parallel with the contacts of the first relay and a non-conductive state controlled by an applied control signal which turns off the semiconductor switch to disconnect the terminals of the semiconductor switch;

(iii) a control signal generator for generating the control signals for connecting the DC power supply to the load by sequentially in time closing the contacts of the second relay, causing the semiconductor switch to turn on to connect the semiconductor switch terminals together, causing the contacts of the first relay to close and turning off the semiconductor switch and for disconnecting the DC power supply from the load by sequentially in time causing the semiconductor switch to turn on to connect the semiconductor switch terminals, causing the terminals of the first relay to be disconnected, causing the semiconductor switch to turn off, and causing the terminals of the second relay to be disconnected; and a bus control unit for controlling connection and disconnection of the contactors to and from a load bus to which at least one electrical load is connected.

27. A DC power supply in accordance with claim 26 wherein in each contactor:

the semiconductor switch has a higher impedance measured between the terminals of the semiconductor switch than an impedance measured between closed contacts of the first relay;

the second relay has a higher interrupt current rating than the first relay or the semiconductor switch; and opening of the relays provides dielectric isolation of the non-ground DC power potential from the load.

28. A DC power supply in accordance with claim 26 wherein:

the DC power supply provides 270 volts.

29. A DC power supply in accordance with claim 27 wherein:

the DC power supply provides 270 volts.

30. A DC power supply for an airframe comprising:

a plurality of contactors each for controlling connection and disconnection of a DC potential to and from an electrical load, each contactor including (i) a series circuit disposed between a non-ground DC power supply potential and a load having first and second relays each having a pair of contacts, the first relay and the second relay having a conducting state when the pair of contacts are closed and a non-conducting state when the pair of contacts are open which control current flow between the DC power supply and the load with the states being controlled by control signals applied to the relays;

(ii) a semiconductor switch having a conductive state controlled by an applied control signal which turns on the semiconductor switch to connect terminals of the semiconductor switch together and in parallel with the contacts of the first relay and a non-conductive state controlled by an applied control signal which turns off the semiconductor switch to disconnect the terminals of the semiconductor switch;

(iii) a fault sensor coupled to the load for generating a signal in response to the load drawing current exceeding a threshold which causes the second relay to open to disconnect the load from the DC potential; and (iv) a control signal generator for generating the control signals to control connecting the DC power supply to the load and disconnecting the DC power supply from the load; and a bus control unit for controlling the connection and disconnection of the contactors to and from a load bus to which at least one electrical load is connected.

31. A DC power supply in accordance with claim 30 wherein in each contactor:

each semiconductor switch has a higher impedance measured between terminals of the semiconductor switch than an impedance measured between closed contacts of the first relay;

the second relay has a higher interrupt current rating than the first relay or the semiconductor switch;

only the second relay is opened in response to a signal from the fault sensor; and opening of the relays provides dielectric isolation of the non-ground DC power supply potential from the load.

32. A DC power supply in accordance with claim 30 wherein:

the DC power supply provides 270 volts.

33. A DC power supply in accordance with claim 31 wherein:

the DC power supply provides 270 volts.

34. A DC power supply in accordance with claim 30 wherein in each contactor;

the fault sensor is powered by load current.

35. A DC power supply in accordance with claim 31 wherein in each contactor:

the fault sensor is powered by load current and is comprised of a winding through which load current flows to generate the signal causing the second relay to open when the load current exceeds the threshold.

* * * * *